United States Patent [19]

Barahia et al.

[11] Patent Number: 5,914,547

[45] Date of Patent: Jun. 22, 1999

[54] AUXILIARY BEARING ASSEMBLY FOR REDUCTION OF UNWANTED SHAFT VOLTAGES IN AN ELECTRIC MOTOR

[75] Inventors: Manoj M. Barahia, Manchester, Mo.; Clyde Hancock, Tampa, Fla.

[73] Assignee: MagneTek, Inc., Nashville, Tenn.

[21] Appl. No.: 08/975,760

[22] Filed: Nov. 21, 1997

[51] Int. Cl.$^6$ .............................. H02K 7/08; H02K 11/00
[52] U.S. Cl. .................................. 310/71; 310/90; 439/17
[58] Field of Search ........................... 310/90, 71; 439/17

[56] References Cited

U.S. PATENT DOCUMENTS

| | | | |
|---|---|---|---|
| 4,006,954 | 2/1977 | Ikawa et al. ............................. | 339/8 R |
| 4,106,830 | 8/1978 | Surgatz ..................................... | 339/8 R |
| 5,139,425 | 8/1992 | Daviet et al. ............................. | 439/17 |
| 5,313,129 | 5/1994 | Stewart ..................................... | 310/90 |
| 5,454,724 | 10/1995 | Kloeppel et al. ........................ | 439/17 |

*Primary Examiner*—Nestor Ramirez
*Assistant Examiner*—Judson H. Jones
*Attorney, Agent, or Firm*—Waddey & Patterson; Mark J. Patterson

[57] ABSTRACT

An auxiliary bearing assembly is used to ground the shaft of an electric motor to reduce unwanted currents in the motor bearings. An auxiliary bearing is either initially mounted onto the housing of the motor or retrofitted to attach the motor, so that the shaft of the motor is in electrical and mechanical contact with the center bore of the auxiliary bearing. An electrically conductive grease is then applied via the auxiliary bearing to the shaft of the bearing that is joined to the rotor shaft. A low resistance path to ground is thereby created for the dissipation of the unwanted shaft voltages and consequently prevents harm to the machine.

18 Claims, 1 Drawing Sheet

AUXILIARY BEARING ASSEMBLY FOR REDUCTION OF UNWANTED SHAFT VOLTAGES IN AN ELECTRIC MOTOR

BACKGROUND OF THE INVENTION

The present invention relates generally to rotating electrical machinery such as motors and generators, and more particularly to the elimination or reduction of shaft voltages in an electric induction motor caused by common mode currents or by other conditions know in the art to produce shaft voltages.

Those skilled in the design and operation of rotating electrical machines have long recognized problems created by unwanted shaft voltages and bearing currents which can be induced as a consequence of routine operation of the machine. For example, conventional alternating current (AC) induction motors are often driven by a variable frequency inverter drive. High frequency signals from the inverter can create an electric field between the stator and the rotor of the motor. The electrostatic field and capacitive coupling between the stator and rotor can produce common mode currents, thereby producing voltage on the shaft of the motor. If the shaft is not grounded, the induced shaft voltage can result in an unwanted current flow through a path created by the shaft, bearings, and motor frame. Even though the shaft voltages may be low, the relatively low impedance of the bearings and current path can produce current of relatively high magnitude.

Frequently associated with steady or intermittent bearing currents is arcing across the moving parts of the bearing, from race to ball to race. Over time, this arcing can produce pitting of the metal surfaces and possible bearing failure and, ultimately, motor failure.

Several solutions to the bearing current problem have been proposed or used in the prior art, with limited success. One method that can be used is to insulate both bearings of a two bearing motor. However, this creates unwanted additional expense in the manufacture of the motor. Moreover, if the motor shaft is connected to another load with a bearing, the shaft voltage will be transferred to that load bearing.

Others have attempted to eliminate motor bearing currents by grounding the shaft using slip rings and brushes mounted to the shaft. Unfortunately, this solution has generally been found to be unacceptable in some applications for several reasons. The use of slip rings and brushes increases the cost of the motor assembly significantly and they are difficult to mount. The brushes also create dust contamination in and around the motor and tend to wear out. This adds maintenance time and expense.

An analogous solution that has been used in motors for computer disc drives has been electrically conductive grease ("ECG") to dissipate the electrical charge that accumulates in the motor bearings from static electricity. In U.S. Pat. No. 5,454,724 (the '724 patent), a method and apparatus for providing a controlled resistance electrical path from the rotor to stator in an electric motor used in a disc drive. ECG is applied between the rotating and static element of an electric drive. The ECG then allows the flow of electrostatic charge where it maintains a reliable current path between rotor and stator via the housing. This solved the problem of the build-up of an electrostatic charge between the read-write head of the drive and the disc itself. The problem remains in that the '724 patent requires a pre-loaded ball-like sphere immersed in ECG to be mounted and held in a center hole in the end of the shaft of the motor. Therefore, the problem of unwanted bearing currents arising in general electric motors still remains because the '724 patent does not teach a method for that is applicable to all conventional motors or a method that can be retrofitted to any motor.

What is needed, then, and not found in the prior art, is an inexpensive, durable, and convenient way for eliminating or reducing shaft voltages caused by common mode currents in electric motors driven by variable frequency inverter drives, or by other factors.

SUMMARY OF THE INVENTION

To eliminate or reduce the build up of electric potentials on the shaft or in the bearings of a motor, an auxiliary bearing lubricated with electrically conductive grease ("ECG") is added to the motor system. The auxiliary bearing is mounted inside and contacts the inner wall of a bearing bracket that is attached externally to the front end bracket or fan housing of the motor, opposite the output end of the shaft. The auxiliary bearing surrounds and rotatably supports an auxiliary bearing shaft. The auxiliary bearing shaft is aligned with the motor shaft and extends into the motor to contact the end of the motor shaft through an opening in the motor housing. Consequently, a low resistance electrical path is established from the motor shaft to the auxiliary bearing shaft, then through the ECG, bearing and bearing bracket to the motor housing. This provides a path to ground the motor shaft, thereby providing a low impedance path for the currents to flow, resulting in a lower voltage on the shaft. Therefore, the auxiliary bearing can be retrofitted for mounting outboard of the motor so that no major reconstruction of the machine is necessary. In another embodiment, the auxiliary bearing can be designed and manufactured into the motor initially at a similar location.

The auxiliary bearing does not create a significant radial load. Preferably, a wafer spring or similar component is mounted between the bearing and the bearing housing to provide a slight axial load for the bearing

DESCRIPTION OF THE PREFERRED EMBODIMENTS

Figure 1:
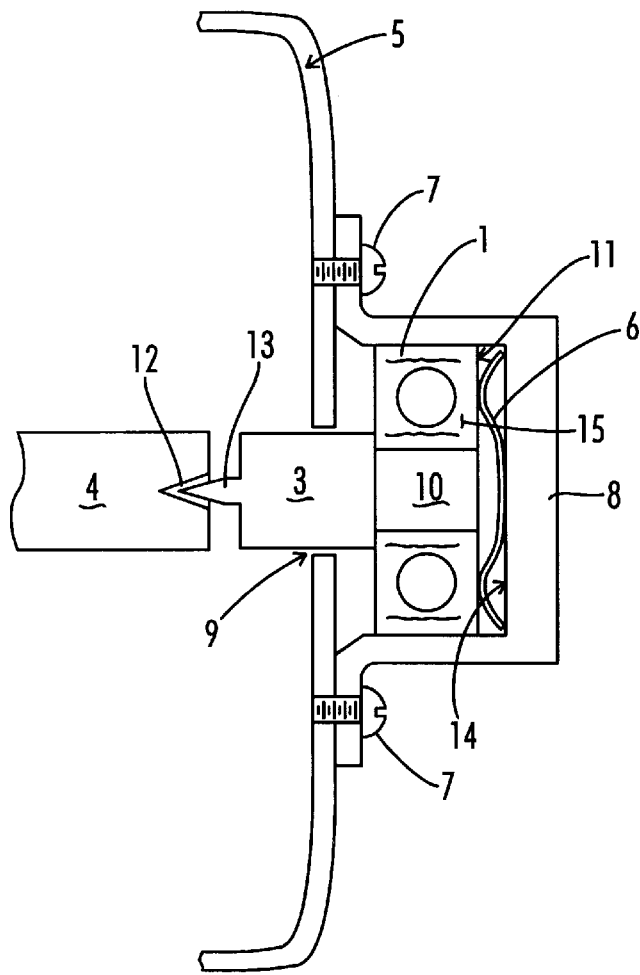
FIG. 1 is a cut-away sectional side view of a first embodiment of the auxiliary bearing assembly of the present invention mounted to the frame of an electric motor.

An embodiment of the auxiliary bearing assembly of the present invention is shown in a side cut-away view in FIG. 1. An auxiliary bearing bracket 8 is mechanically attached to the housing 5 (e.g. a front end bracket or fan cover) of a conventional electric induction motor having a rotating motor shaft 4 supported therein by a pair of standard bearing assemblies (not shown). The bearing bracket 8 is mounted to the housing 5 at the end of the motor opposite the load or output end of the shaft 4 by using two or more screws 7 or other conventional means of mechanical attachment. In accordance with an object of this invention, the auxiliary bearing bracket 8 must be grounded. Assuming that the motor housing 5 is itself grounded and will be a part of the electrical grounding path, the electrical contact between bracket 8 and housing 5 must be of very low resistance.

An auxiliary bearing 1 is supported within and by the bracket 8 so that the center bore 10 of the bearing 1 is aligned with an opening 9 in the motor housing 5. The opening 9 is in turn aligned with the end of the shaft 4. The auxiliary bearing 1 rotatably supports a first end of an auxiliary shaft 3 within bore 10. The auxiliary shaft 3 extends through the opening 9 inside housing 5 to so that a second end of the auxiliary shaft 3 can engage motor shaft 4. One method of connecting the auxiliary shaft 3 co-linearly with motor shaft 4 is to provide auxiliary shaft 3 with a protruding male stub 13 that can mate with a conforming female receptacle 12 that is machined into the end of motor shaft 4 so that auxiliary shaft 3 and motor shaft 4 will rotate together and such that a low resistance electrical connection is made between auxiliary shaft 3 and motor shaft 4.

As an alternative to the arrangement shown in FIG. 1, the male stub 13 can be press fit into a female receptacle 12 in either the auxiliary shaft 3 or into the motor shaft 4. As yet another shaft connection means, threads, splines, and/or knurling of the stub and receptacle can be used to enhance the mechanical connection.

The race of auxiliary bearing I is filled with an electrically conductive grease (ECG) 15 which can be a mixture of lubricating grease and a conductive material. An example of an ECG that could be used with the current invention is that disclosed in U.S. Pat. No. 4,950,413. The ECG performs two functions: it lubricates the auxiliary bearing 1 and establishes a low resistance conductive path between the auxiliary shaft 10 and the outside race wall 11. As is known those of reasonable skilled in the art, a bearing grease is a compound formed primarily of two components, a lubricating oil and a thickening agent. Accordingly, an electrically conductive grease or lubricating compound as used and claimed in this invention can be one in which the conductive material is added to either the lubricating oil, to the thickening agent, or to both.

Figure 2:
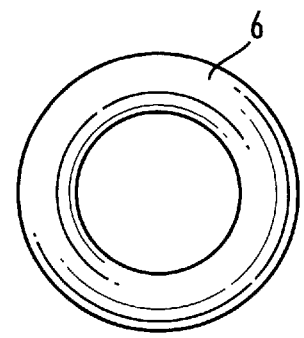
FIG. 2 is a plan view of the wafer spring used in the auxiliary bearing assembly of FIG. 1 to provide a small axial load along the auxiliary bearing shaft.

To provide a slight axial load against the auxiliary bearing 1, a spring 6, such as a wafer spring or spring loaded is positioned between an inner wall 14 of the bearing bracket 8 and the race wall 11 of auxiliary bearing 1. As shown in FIGS. 1 and 2, the wafer spring 6 is curved to have non-planar top and bottom surfaces so that, when under compression, it will help to maintain auxiliary bearing 1 in a fixed axial position and assist in distributing the ECG completely around the bearing shaft 3 during shaft rotation. An example of a type of wafer spring that can be used in this application is Catalog Part No. W1543-020 from the SPEC Catalog, New Brunswick, Nova Scotia.

Although the embodiment of FIG. 1 is particularly suited for retrofitting to an existing motor, the auxiliary bearing assembly of this invention can be incorporated into a motor as originally manufactured. For example, the motor housing 5 can be fabricated to include a bracket 8 for an auxiliary bearing 1 and/or the motor shaft 4 can be extended through opening 9 in the motor housing 5 so that it can rest directly within bore 10 of the auxiliary bearing 1. In this latter configuration, auxiliary bearing shaft 3 will not be needed.

It will be apparent to those skilled in the art that the auxiliary bearing assembly of this invention will provide a low resistance path to ground from the motor shaft 4 to auxiliary bearing shaft 3, and then through the ECG inside auxiliary bearing 1 to bearing race wall 11, and finally through bearing bracket 8 and motor housing 5 to ground. Consequently, any voltage that may be generated on motor shaft 4 will be quickly dissipated so that damaging currents will not pass through the standard motor shaft bearings.

Figure 3:
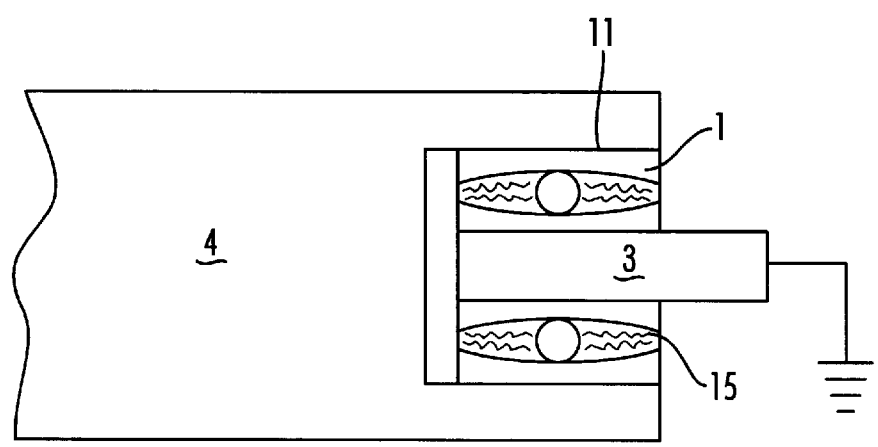
FIG. 3 is a cut-away side view of a second embodiment of the invention in which the auxiliary bearing assembly is mounted inside the motor shaft.

A second embodiment of the invention is shown in FIG. 3 in which the auxiliary bearing assembly is integrated into the motor shaft 4. The auxiliary bearing 1 is positioned between a stationary auxiliary shaft 3 which is electrically grounded in a conventional manner. The ECG 15 inside the auxiliary bearing 1 completes a conductive path from the motor shaft 4, through the outer race wall 11 of bearing 1, the conductive grease 15 to the inner race wall 1, to the auxiliary shaft 3 and then to ground.

Thus, although there have been described particular embodiments of the present invention of a new and useful Auxiliary Bearing Assembly for Reduction of Unwanted Shaft Voltages in an Electric Motor, it is not intended that such references be construed as limitations upon the scope of this invention except as set forth in the following claims.

What is claimed is:

1. An auxiliary bearing assembly in combination with an electric motor having a motor housing and a motor shaft comprising:
    a. an auxiliary bearing bracket attached to the motor housing;
    b. an auxiliary bearing having an outer race and an inner race defining a central bore, the outer bearing race supported by and in electrical contact with the auxiliary bearing bracket;
    c. the bore of the auxiliary bearing in electrical and mechanical contact with the motor shaft; and
    d. the auxiliary bearing including a lubricating compound having a conductive material to create an enhanced electrically conductive path from the bore to the bearing outer race.

2. The combination of claim 1 further comprising an auxiliary bearing shaft having a first end rotatably positioned within the bore of the auxiliary bearing and second end that engages the motor shaft within the motor housing such that the auxiliary bearing shaft and the motor shaft are coaxially aligned and rotate together.

3. The combination of claim 2 in which the lubricating compound comprises a lubricating oil and a thickening agent and in which the conductive material is added to the lubricating oil.

4. The combination of claim 2 in which the lubricating compound comprises a lubricating oil and a thickening agent and in which the conductive material is added to the thickening agent.

5. The combination of claim 2 further comprising a male stub member that mechanically engages a female receptacle to provide the engagement between the second end of the auxiliary shaft and the motor shaft.

6. The combination of claim 1 further comprising a spring member positioned between the auxiliary bearing an inner wall of the auxiliary bearing bracket.

7. A retrofit kit for grounding the shaft of an electric motor comprising:
    a. an auxiliary bearing having a center bore and a conductive outer race;
    b. a conductive auxiliary bearing bracket adapted to receive and support the auxiliary bearing outer race;
    c. means to mechanically and electrically attach the auxiliary bearing bracket to an existing housing on the motor so that the center bore of the auxiliary bearing is aligned with an opening in the motor housing opposite an unloaded end of the motor shaft; and d. a conductive bearing lubricant adapted for use with the auxiliary bearing.

8. The retrofit kit of claim 7 further comprising an auxiliary bearing shaft having a first end adapted to engage the center bore of the auxiliary bearing and a second end adapted to engage the unloaded end of the motor shaft.

9. The retrofit kit of claim 8 further comprising a spring member adapted to be positioned between the auxiliary bearing and the auxiliary bearing bracket.

10. In an electric motor having a shaft and a housing, the improvement comprising:
   a. an auxiliary bearing having a center bore that is aligned with and in electrical and mechanical contact with the shaft, and a conductive outer bearing race that is electrically grounded; and
   b. the auxiliary bearing lubricated with a lubricating compound having a conductive component so that a low resistance electrical path to ground is created from the shaft through the auxiliary bearing.

11. The improved electric motor of claim 10 wherein the bearing outer race is grounded through an auxiliary bearing bracket that supports the auxiliary bearing.

12. The improved electric motor of claim 11 wherein the auxiliary bearing bracket is attached outside the motor housing.

13. The improved electric motor of claim 12 further comprising an auxiliary bearing shaft that mechanically and electrically connects the auxiliary bearing to the motor shaft.

14. The improved electric motor of claim 13 further comprising means to produce an axial load on the auxiliary bearing.

15. An auxiliary bearing assembly in combination with an electric motor having a motor shaft comprising:
   a. an auxiliary bearing positioned inside and integral to the motor shaft;
   b. the auxiliary bearing having an outer race and an inner race defining a central bore, the outer bearing race supported by and in electrical contact with the motor shaft;
   c. the bore of the auxiliary in electrical and mechanical contact with an auxiliary shaft that extends coaxially outside and away from the motor shaft, the auxiliary shaft being electrically grounded; and
   d. the auxiliary bearing including a lubricating compound having a conductive material to create an enhanced electrically conductive path from the bore to the bearing outer race.

16. The combination of claim 15 in which the lubricating compound comprises a lubricating oil and a thickening agent, and the conductive material is added to the thickening agent.

17. A method of grounding the shaft of an electric motor having a motor housing comprising the steps of:
   a. attaching an auxiliary bearing to the motor such that a center bore of the auxiliary bearing is electrically and mechanically connected to the motor shaft;
   b. lubricating the auxiliary bearing with a material that is electrically conductive to establish a conductive path from the motor shaft to an outer race of the auxiliary bearing; and
   c. electrically grounding the outer race of the auxiliary bearing.

18. The method of claim 17 further comprising grounding the outer race of the auxiliary bearing to the motor housing through a bearing bracket attached to the housing.

* * * * *